(12) United States Patent
Kim et al.

(10) Patent No.: US 9,962,653 B2
(45) Date of Patent: May 8, 2018

(54) CATALYZED PARTICULATE FILTER

(71) Applicant: Hyundai Motor Company, Seoul (KR)

(72) Inventors: Pyung Soon Kim, Gyeonggi-do (KR);
Chang Ho Jung, Gyeonggi-do (KR);
Chang Hwan Kim, Gyeonggi-do (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days. days.

(21) Appl. No.: 15/267,222

(22) Filed: Sep. 16, 2016

(65) Prior Publication Data
US 2017/0157562 A1 Jun. 8, 2017

(30) Foreign Application Priority Data

Dec. 4, 2015 (KR) .................. 10-2015-0172450

(51) Int. Cl.
| | | |
|---|---|---|
| *F01N 3/022* | (2006.01) | |
| *B01D 53/94* | (2006.01) | |
| *B01J 35/04* | (2006.01) | |
| *F01N 3/033* | (2006.01) | |

(52) U.S. Cl.
CPC .............. *B01D 53/94* (2013.01); *B01J 35/04* (2013.01); *F01N 3/022* (2013.01); *F01N 3/0335* (2013.01); *B01D 2255/9155* (2013.01)

(58) Field of Classification Search
None
See application file for complete search history.

(56) References Cited

U.S. PATENT DOCUMENTS

| | | | |
|---|---|---|---|
| 8,147,762 B2 | 4/2012 | Dorling | |
| 2010/0037600 A1* | 2/2010 | Doring | .................. F01N 3/0222 60/297 |
| 2014/0154145 A1* | 6/2014 | Aoki | .................... B01J 35/0006 422/180 |
| 2015/0071839 A1 | 3/2015 | Massner et al. | |

FOREIGN PATENT DOCUMENTS

| | | |
|---|---|---|
| EP | 2154343 A1 | 2/2010 |
| EP | 2554266 A1 | 2/2013 |
| EP | 2659950 A1 | 11/2013 |
| EP | 2737945 A1 | 6/2014 |
| JP | 2002349238 A | 12/2002 |
| JP | 3922077 B2 | 5/2007 |
| JP | 2013032706 A | 2/2013 |
| JP | 2015516534 A | 6/2015 |
| KR | 100747088 B1 | 8/2007 |
| KR | 101305182 B1 | 9/2013 |

OTHER PUBLICATIONS

European Patent Office, Munich, Germany, Extended European Search Report of European Patent Application No. 16193213.2-1616, dated Mar. 8, 2017, 8 pages.

* cited by examiner

*Primary Examiner* — Walter D. Griffin
*Assistant Examiner* — Jelitza M Perez
(74) *Attorney, Agent, or Firm* — Brinks Gilson & Lione

(57) ABSTRACT

A catalyzed particulate filter that includes: at least one inlet channel extending in a longitudinal direction, one end of which lets fluid in, and the other end of which is blocked; at least one outlet channel extending in the longitudinal direction, one end of which is blocked and the other end of which lets the fluid out; at least one porous wall that defines the boundary between neighboring inlet and outlet channels and that extends in the longitudinal direction; and a support with a catalyst coating thereon.

14 Claims, 6 Drawing Sheets

CATALYZED PARTICULATE FILTER

CROSS-REFERENCE TO RELATED APPLICATION

This application claims priority to and the benefit of Korean Patent Application No. 10-2015-0172450 filed on Dec. 4, 2015, the entire content of which is incorporated herein by reference.

FIELD

The present disclosure relates to a catalyzed particulate filter, and more particularly, to a catalyzed particulate filter that minimizes an increase in back pressure and provides a longer contact time (larger contact area) between a catalyst and a fluid.

BACKGROUND

Exhaust gases from internal combustion engines, such as diesel engines or a variety of combustion equipment, contain particulate matter (PM). Such PM can cause environmental pollution when emitted into the atmosphere. For this reason, gas exhaust systems are equipped with a particulate filter for capturing PM.

The particulate filter may be categorized as a flow-through particulate filter or a wall-flow particulate filter depending on the flow of fluid. In the flow-through particulate filter, a fluid let into a channel flows only within this channel without moving to another channel. This helps minimize an increase in back pressure, but necessitates a means for capturing particulate matter in the fluid and may result in low filter performance.

In the wall-flow particulate filter, a fluid let into a channel moves to a neighboring channel and is then released from the particulate filter through the neighboring channel. That is, a fluid let into an inlet channel moves to an outlet channel through a porous wall and is then released from the particulate filter through the outlet channel. When a fluid passes through the porous wall, particulate matter in the fluid is captured without passing through the porous wall. The wall-flow particulate filter is effective at removing particulate matter, although it may increase the back pressure to some extent. Hence, wall-flow particulate filters are primarily used.

A vehicle is equipped with at least one catalytic converter, along with a particulate filter. The catalytic converter is designed to remove carbon monoxide (CO), hydrocarbon (HC), and nitrogen oxide ($NO_x$).

The catalytic converter may be physically separated from the particulate filter, or combined with the particulate filter by coating the particulate filter with a catalyst. The particulate filter coated with a catalyst may be called a catalyzed particulate filter (CPF).

In the CPF, the catalyst is coated on the porous wall that separates the inlet channel and the outlet channel from each other, and the fluid passes through the porous wall and comes into contact with the catalyst coating. There is a pressure difference between the inlet channel and outlet channel separated by the porous wall. This allows the fluid to pass fast through the porous wall. Accordingly, the contact time between the catalyst and the fluid is short, which makes it hard for a catalytic reaction to occur efficiently.

Also, a thick catalyst coating on the porous wall allows the catalyst to block the micropores on the wall, and this may disturb the flow of the fluid from the inlet channel to the outlet channel. Accordingly, the back pressure increases. To minimize the increase in back pressure, a catalyst is thinly coated on the walls in the CPF. However, the amount of catalyst coating on the CPF may be insufficient for the catalytic reaction to occur efficiently.

To overcome this problem, the surface area of walls to be coated with the catalyst may be increased by increasing the number (density) of inlet channels and outlet channels (hereinafter, collectively referred to as 'cells'). However, the increase in cell density in the limited space reduces the wall thickness. The reduction in wall thickness may deteriorate the filter performance. Therefore, the cell density should not be increased to more than the density limit.

The above information disclosed in this Background section is only for enhancement of understanding of the background of the present disclosure and therefore it may contain information that does not form part of the prior art that is already known in this field to a person of ordinary skill.

SUMMARY

The present disclosure generally provides a catalyzed particulate filter that minimizes an increase in back pressure and increases catalyst loading. According to another aspect of the present disclosure, the catalyzed particulate filter can minimize an increase in back pressure and provide a longer contact time between a catalyst and a fluid.

According to one aspect of the present disclosure a catalyzed particulate filter is provided that includes at least one inlet channel extending in a longitudinal direction, and having one end into which fluid flows and the other end which is blocked. The catalyzed particulate filter further comprises at least one outlet channel extending in the longitudinal direction, and having one end which is blocked and the other end through which the fluid flows out; at least one porous wall that defines the boundary between neighboring inlet and outlet channels and that extends in the longitudinal direction; and a support with a catalyst coating thereon. The fluid flowing into through the inlet channel may pass through the porous wall and flow to the outlet channel.

The support may be located within at least one among the at least one inlet channel and the at least one outlet channel. The support may extend in the longitudinal direction. The catalyst may be coated on the surface of the support. The catalyst may be additionally coated on the porous wall.

In one aspect of the present disclosure, the support may be made from the same material as the porous wall. In another aspect, the support may be made from a different material from the porous wall.

The support may be located within at least one of the inlet channels and be located within at least one of the outlet channels. Alternatively, the support may be located only within at least one of the one inlet channels or only within one of the outlet channels.

The support may extend over a predetermined length from one end of the catalyzed particulate filter. The predetermined length may be about 50% to 70% of the entire length of the catalyzed particulate filter.

According to yet another aspect of the present disclosure, a catalyzed particulate filter is provided that includes at least one inlet channel having one end which is opened to receive fluid there into and the other end which is blocked to prevent the fluid from flowing out there through. This catalyzed particulate filter further comprises at least one outlet channel disposed alternately with the at least one inlet channel and having one end which is blocked to prevent the fluid from flowing there through and the other end which is opened to cause the fluid to flow out; a porous wall that is placed between neighboring inlet and outlet channels and that allows the fluid in the inlet channel to flow to the outlet channel; and a support with a catalyst thereon that is located within at least one of the inlet channels and the outlet channels.

The inlet channel and the outlet channel may extend parallel to each other, and the support may extend parallel, perpendicular, or obliquely to the direction in which the inlet channel and the outlet channel extend.

The catalyst may be additionally coated on the porous wall. In this case, the amount of catalyst coating on the support may be greater than the amount of catalyst coating on the porous wall. In one aspect, the support may be made from the same material as the porous wall. In another aspect, the support may be made from a different material from the porous wall. The support may be thinner than the porous wall.

The support may extend parallel to the direction in which the inlet channel and the outlet channel extend, and the support may extend over a predetermined length from one end of the catalyzed particulate filter. The predetermined length may be set based on the temperature distribution of the particulate filter.

As described above, it is possible to minimize an increase in back pressure and increase catalyst loading by forming a support within at least one of the inlet channels and at least one outlet channel, as well as coating the support with a catalyst.

Moreover, the contact time between exhaust gases and the catalyst may be lengthened because the pressure difference between first and second parts of a channel separated by the support and the pressure difference between one end and the other end of the first or second part along the length of the support are small.

In addition, sufficient filter performance and catalyst performance can be achieved since larger catalyst loading and a larger contact area (I) between a fluid and the catalyst are provided while keeping the wall thickness constant.

Further areas of applicability will become apparent from the disclosure provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

DETAILED DESCRIPTION

The following detailed description is merely exemplary in nature, and is not intended to limit the present disclosure, application, or uses. Reference is made in detail to various forms of the present disclosure, examples of which are shown and described, simply by way of illustration. As those skilled in the art would realize, the described various forms may be modified in various different ways, all without departing from the spirit or scope of the present invention.

A catalyzed particulate filter according to one aspect of the present disclosure can be adapted for use in a variety of devices, as well as vehicles, that get energy by burning fossil fuels and emit gases produced in the burning process into the atmosphere. Although this specification illustrates an example of a catalyst particulate filter adapted for use in a vehicle, the present disclosure should not be construed as limited to this specific example.

The vehicle is equipped with an engine for generating power. The engine converts chemical energy into mechanical energy by the combustion of a fuel-air mixture. The engine is connected to an intake manifold to draw air into a combustion chamber, and connected to an exhaust manifold where exhaust gases produced during combustion are collected and emitted out. Injectors are mounted at the combustion chamber or intake manifold to spray fuel into the combustion chamber or intake manifold.

Exhaust gases produced from the engine are emitted out of the vehicle via an exhaust system. The exhaust system may include an exhaust pipe and exhaust gas recirculation (EGR) equipment. The exhaust pipe is connected to the exhaust manifold to emit exhaust gases out of the vehicle.

The exhaust gas recirculation equipment is mounted on the exhaust pipe, and exhaust gases emitted from the engine pass through the exhaust gas recirculation equipment. Also, the exhaust gas recirculation equipment is connected to the intake manifold to mix some of the exhaust gases with air and control the combustion temperature. The combustion temperature may be regulated by controlling the ON/OFF of an EGR valve (not shown) in the exhaust gas recirculation equipment. That is, the amount of exhaust gases supplied to the intake manifold is adjusted by controlling the ON/OFF of the EGR valve.

The exhaust system may further include a particulate filter that is mounted on the exhaust pipe and captures particulate matter in exhaust gases. The particulate filter may be a catalyzed particulate filter according to an exemplary embodiment of the present invention that removes harmful substances as well as particulate matter in exhaust gases.

Hereinafter, a catalyzed particulate filter according to one aspect of the present disclosure is described in detail with reference to the accompanying drawings.

Figure 1:
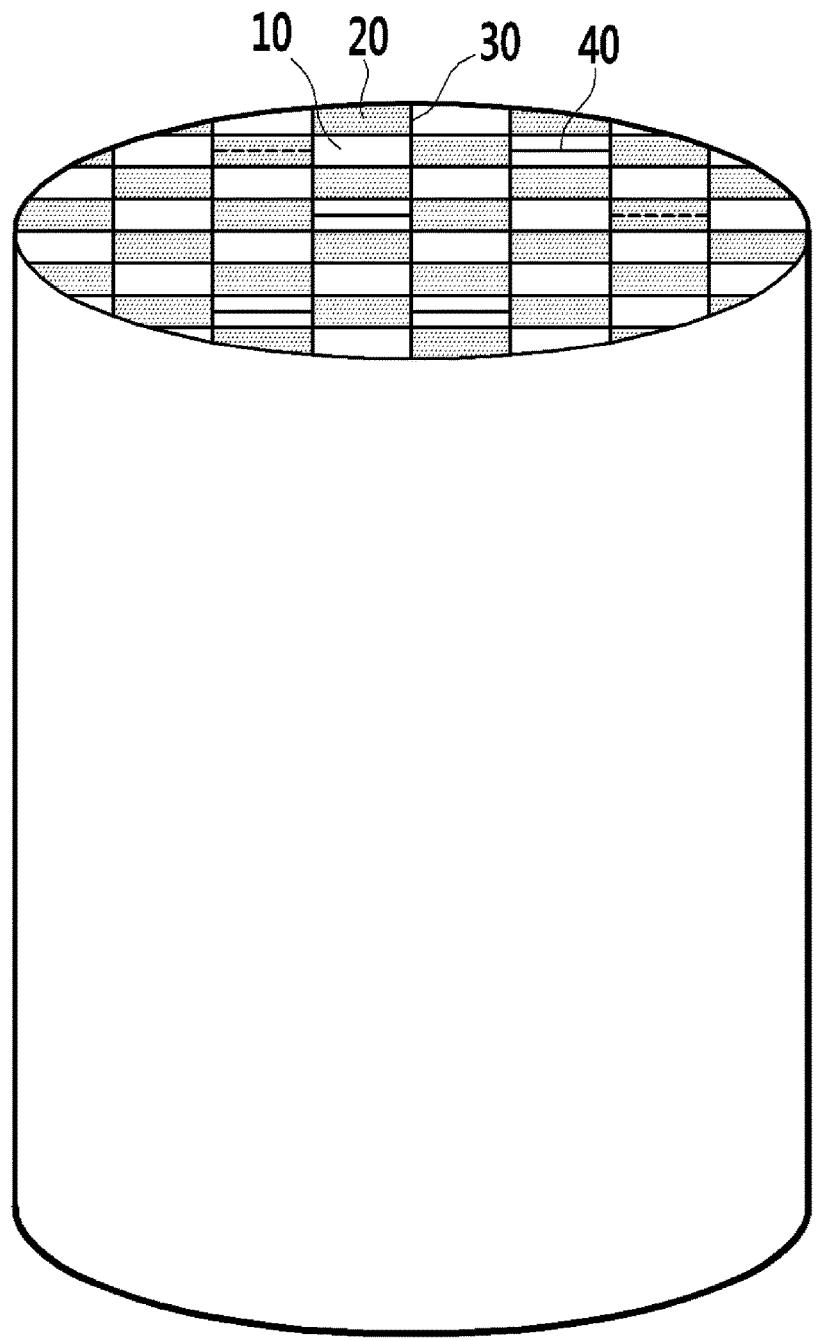
FIG. 1 is a perspective view of a catalyzed particulate filter according to one aspect of the present disclosure.
Figure 2:
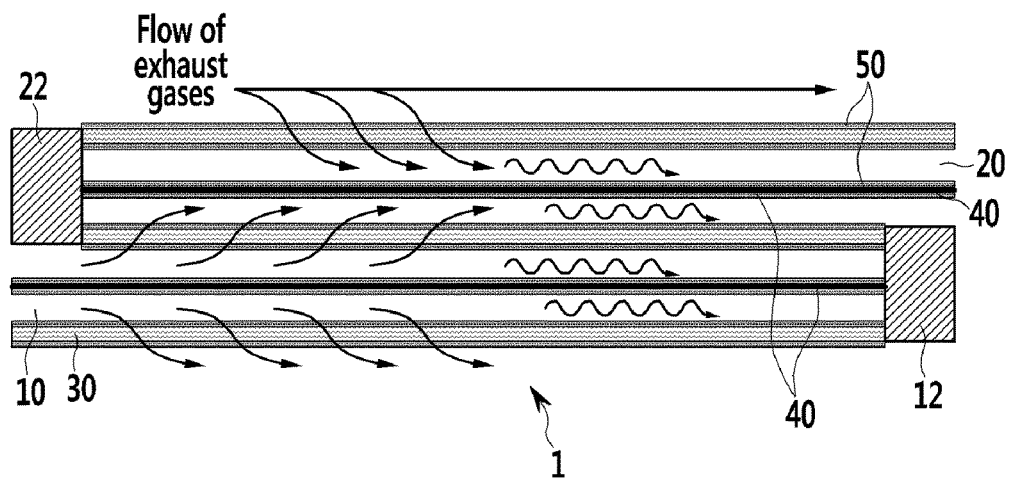
FIG. 2 is a cross-sectional view of the catalyzed particulate filter of FIG. 1.
Figure 3:
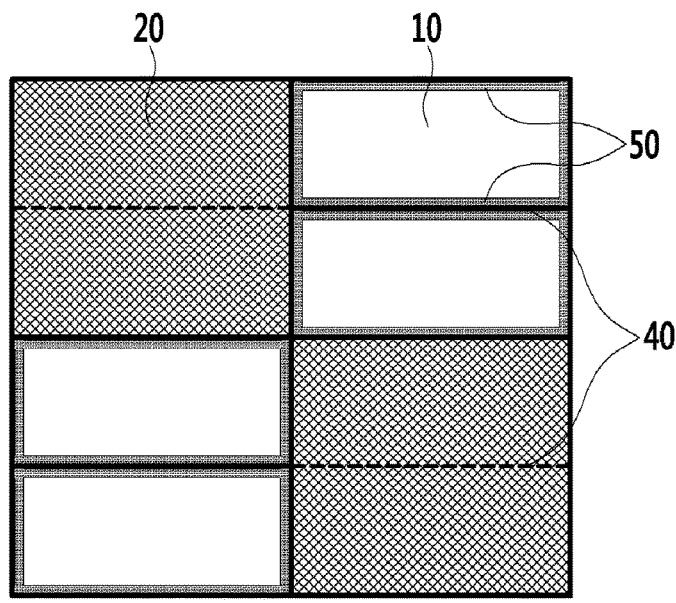
FIG. 3 is a front view illustrating some of inlet and outlet channels in the catalyzed particulate filter of FIG. 1.

Referring to FIG. 1, a perspective view of a catalyzed particulate filter according to one aspect of the present disclosure is provided. In FIG. 2, a cross-sectional view of the catalyzed particulate filter in FIG. 1 is shown. In FIG. 3 a front view illustrating some of inlet and outlet channels in the catalyzed particulate filter of FIG. 1 is provided.

As illustrated in FIG. 1, a catalyzed particulate filter may include, within a housing, at least one inlet channel 10 and at least one outlet channel 20. The at least one inlet channel 10 and the at least one outlet channel 20 are separated from each other by walls 30. A support 40 may be located within at least one of the inlet channels 10 and the outlet channels 20.

In this specification, the inlet channel 10 and the outlet channel 20 may be collectively referred to as 'cells'. Although, in this specification, the housing has a cylindrical shape and the cells have a rectangular shape, the housing and the cells are not limited to such shapes.

Referring now to FIG. 2 and FIG. 3, the inlet channel 10 extends along the flow of exhaust gases. The front end of the inlet channel 10 is opened so that exhaust gases are introduced into a particulate filter 1 through the inlet channel 10. The rear end of the inlet channel 10 is blocked by a first plug 12. Thus, the exhaust gases in the particulate filter 1 are kept from flowing out of the particulate filter 1 through the inlet channel 10.

The outlet channel 20 extends along the flow of exhaust gases, and may be placed parallel to the inlet channel 10. At least one inlet channel 10 is located around the outlet channel 20.

For example, if the cells have a rectangular shape, each outlet channel 20 is surrounded by walls 30 on four sides. At least one of the four sides is located between each outlet channel 20 and a neighboring inlet channel 10. If the cells have a rectangular shape, each outlet channel 20 may be surrounded by four neighboring inlet channels 10 and each inlet channel 10 may be surrounded by four neighboring outlet channels 20, but the present disclosure is not limited thereto.

Since the front end of the outlet channel 20 is blocked by a second plug 22, exhaust gases are kept from flowing into the particulate filter 1 through the outlet channel 20. The rear end of the outlet channel 20 is opened so that exhaust gases in the particulate filter 1 flow out of the particulate filter 1 through the outlet channel 20.

A wall 30 is placed between neighboring inlet and outlet channels 10 and 20 to define the boundary between them. The wall 30 may be a porous wall 30 with at least one micropore in it. The porous wall 30 allows the neighboring inlet and outlet channels 10 and 20 to fluidly communicate with each other. Thus, the exhaust gases introduced into the inlet channel 10 may move to the outlet channel 20 through the porous wall 30. Moreover, the porous wall 30 does not let particulate matter in the exhaust gases pass through. When the exhaust gases move from the inlet channel 10 to the outlet channel 20 through the porous wall 30, the particulate matter in the exhaust gases is filtered through the porous wall 30. The porous wall 30 may be made, without limitation, from aluminum titanate, codierite, silicon carbide, or a mixture thereof.

The porous wall 30 may be coated with a catalyst 50. The catalyst 50 coated on the porous wall 30 is not limited to any particular composition. In other words, the wall 30 may be coated with a variety of catalysts 50 including, but not limited to, a Lean $NO_x$ Trap (LNT) catalyst, a three-way catalyst, an oxidation catalyst, a hydrocarbon trap catalyst, or a selective catalytic reduction (SCR) catalyst, depending on the design intent. Moreover, two or more types of catalyst 50 may be coated on the wall 30. For example, the LNT catalyst may be coated on the inside wall of the inlet channel 10 and the SCR catalyst may be coated on the inside wall of the outlet channel 20, but the present invention is not limited thereto.

The support 40 may be located within at least one of the inlet channels 10 and the outlet channels 20. The support 40 may be located only within the at least one inlet channel 10 or only within the at least one outlet channel 20. Although FIGS. 1 through 3 illustrate that the support 40 extends parallel to the direction in which the inlet channel 10 and/or the outlet channel 20 extend, the present disclosure is not limited thereto. That is, the support 40 may extend perpendicular or obliquely to the direction in which the inlet channel 10 and/or the outlet channel 20 extend. In the case that the support 40 extends perpendicular or obliquely to the direction in which the inlet channel 10 and/or the outlet channel 20 extend, at least one of the two ends of the support 40 may not come into contact with the porous wall 30 that separates the cells from one another. In the case that the support 40 extends parallel to the direction in which the inlet channel 10 and/or the outlet channel 20 extend, the support 40 may extend over the entire length of the channel 10 or 20 or extend over part of the length of the channel 10 or 20 (see FIG. 10).

The support 40 is coated with a catalyst 50. The catalyst 50 coated on the support 40 is not limited to any particular composition. In other words, the support 40 may be coated with a variety of catalysts 40 including, but not limited to, a Lean $NO_x$ Trap (LNT) catalyst, a three-way catalyst, an oxidation catalyst, a hydrocarbon trap catalyst, or a selective catalytic reduction (SCR) catalyst, depending on the design intent. Moreover, two or more types of catalyst 50 may be coated on the support 40. For example, the LNT catalyst and the SCR catalyst may be sequentially coated on the support 40, but the present disclosure is not limited thereto. Furthermore, different types of catalyst 50 may be coated on one side and the other side of the support 40. Also, the catalyst 50 coated on the support 40 may be a different type from the catalyst 50 coated on the wall 30.

Meanwhile, the support 40 is provided to hold the catalyst 50 in place, rather than serving as a filter. Thus, the support 40 is not necessarily made from a porous material. That is, the support 40 may be made from the same material as the porous wall 30 or a different material. Even in the case that the support 40 is made from a porous material, exhaust gases mostly move along the support 40 and wall 30 without passing through the support 40, because there is little difference in pressure between the two parts of the channel 10 or 20 separated by the support 40. Also, the support 40 does not need to be thick since it is not required to serve as a filter. That is, the support 40 may be thinner than the wall 30, which minimizes an increase in back pressure. For a support 40 made from a porous material, the catalyst 50 is coated on the surface of the support 40 and on the micropores in the support 40. Contrariwise, for a support 40 made from a non-porous material, the catalyst 50 is coated on the surface of the support 40.

As mentioned previously, the catalyst 50 may be coated on both the support 40 and the porous wall 30. In this case, the amount of catalyst 50 coated on the support 40 may be greater than the amount of catalyst 50 coated on the porous wall 30. The catalyst 50 may be thinly coated on the porous wall 30 since the porous wall 40 serves as a filter. On the contrary, the catalyst 50 may be thickly coated on the support 40 since the support 40 is not required to serve as a filter. Accordingly, the amount of catalyst coating on the particulate filter 1 may be increased. Here, the amount of catalyst 50 refers to the amount of catalyst coating per unit length or unit area.

Figure 4:
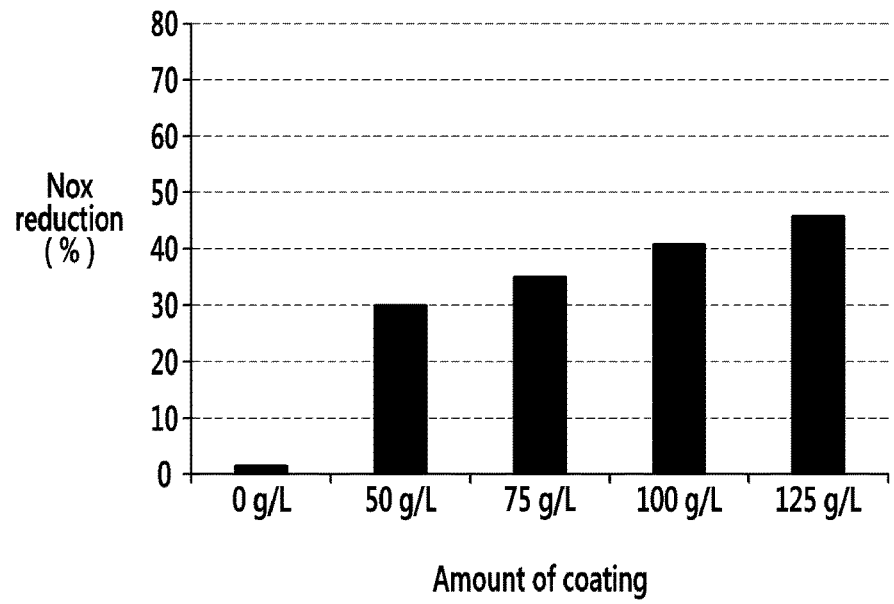
FIG. 4 is a graph illustrating the nitrogen oxide reduction plotted as a function of the amount of catalyst coating on a wall-flow particulate filter.
Figure 5:
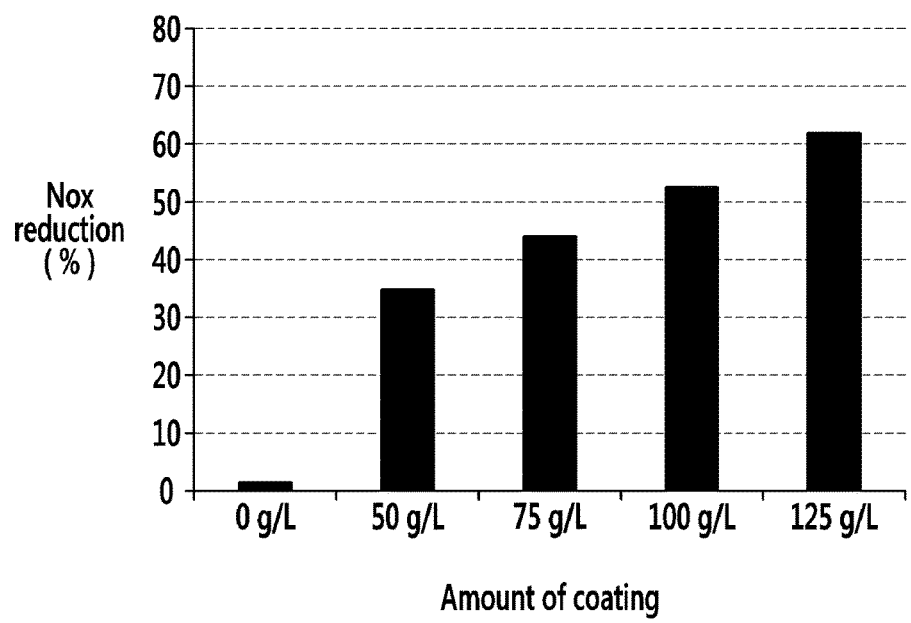
FIG. 5 is a graph illustrating the nitrogen oxide reduction plotted as a function of the amount of catalyst coating on a flow-through carrier.

Referring now to FIG. 4 to FIG. 10, the operation of a catalyzed particulate filter according to another aspect of the present disclosure is described. In FIG. 4 a graph illustrating the nitrogen oxide reduction plotted as a function of the amount of catalyst coating on a wall-flow particulate filter is provided. In FIG. 5 a graph illustrating the nitrogen oxide reduction plotted as function of the amount of catalyst coating on a flow-through carrier is provided.

FIG. 4 and FIG. 5 illustrate measurement data obtained by running the same engine in the same mode. The particulate filter used in the test has the same cross-sectional area, volume, and catalyst coating amount as the carrier used in the test, and the number of cells in the particular filter is different from the number of cells in the carrier. The walls in the particulate filter cannot be made thin since they are required to function as filters, which results in a small number of cells. On the contrary, the walls in the carrier can be made thin since they are not required to function as filters, which results in a larger number of cells. The cell density of the particulate filter used in the test is 300 cpsi (cells per square inch) and the wall thickness is 12 mil (1/1,000 inch), and the cell density of the carrier is 400 cpsi and the wall thickness is 3 mil.

Still referring to FIG. 4 and FIG. 5, the nitrogen oxide reduction with the particulate filter is 5 to 15% lower than the nitrogen oxide reduction with the carrier, under the condition that the same amount of catalyst coating is used. Moreover, the greater the amount of catalyst is coated on the particulate filter or the carrier, the larger the difference in nitrogen oxide reduction is. As the number of cells provided for the same capacity increases, the contact area (contact time) between the walls and exhaust gases increases. Accordingly, even with the same amount of catalyst coating, the flow-through carrier allows for a larger contact area (longer contact time) between the catalyst and exhaust gases, compared to the wall-flow particulate filter, thereby improving the nitrogen oxide reduction. As mentioned previously, the support 40 can play the same role as the flow-through carrier. Accordingly, the nitrogen oxide reduction can be improved by coating the catalyst 50 on the support 40 rather than on the wall 30.

Figure 6:
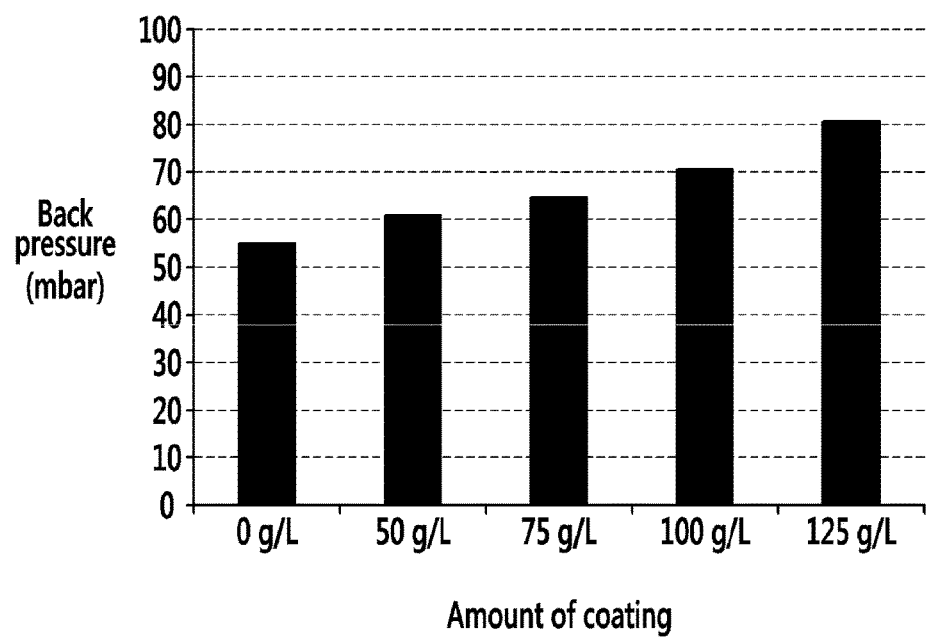
FIG. 6 is a graph illustrating the back pressure plotted as a function of the amount of catalyst coating on the wall-flow particulate filter.
Figure 7:
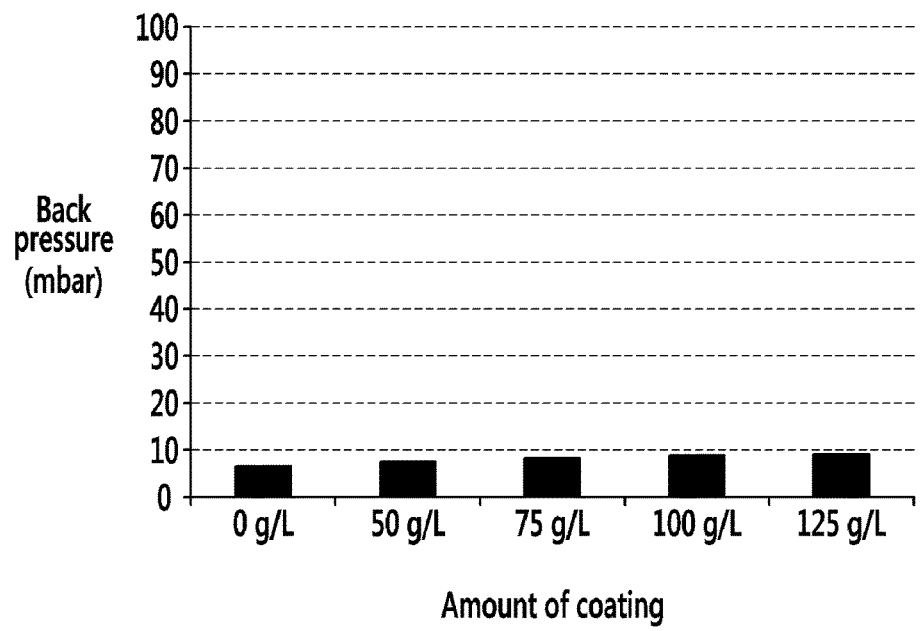
FIG. 7 is a graph illustrating the back pressure plotted as a function of the amount of catalyst coating on the flow-through carrier.

Referring now to FIG. 6 a graph illustrating the back pressure plotted as a function of the amount of catalyst coating on the wall-flow particulate filter is provided. In FIG. 7, a graph illustrating the back pressure plotted as a function of the amount of catalyst coating on the flow-through carrier is provided. FIG. 6 and FIG. 7 illustrate measurement data obtained by running the same engine in the same mode. The particulate filter used in the test has the same cross-sectional area, volume, and catalyst coating amount as the carrier used in the test. The cell density in the particulate filter used in the test is 300 cpsi (cells per square inch) and the wall thickness is 12 mil (1/1,000 inch), and the cell density in the carrier is 400 cpsi and the wall thickness is 3 mil.

Still referring to FIG. 6 and FIG. 7, it can be seen that the back pressure applied to the particulate filter may be five times higher than the back pressure applied to the carrier, under the condition that the same amount of catalyst coating is used. Also, it can be seen that the back pressure applied to the particulate filter can increase greatly as the amount of catalyst coating on the particulate filter increases, whereas the back pressure applied to the carrier increases only slightly even if the amount of catalyst coating on the carrier increases. Accordingly, it is concluded that, in terms of back pressure, the flow-through carrier offers a significant advantage over the wall-flow particulate filter as the amount of catalyst coating becomes greater. As mentioned previously, the support 40 may play the same role as the flow-through carrier. Therefore, coating the catalyst 50 on the support 40 rather than on the wall 40 can minimize the increase in back pressure.

Figure 8:
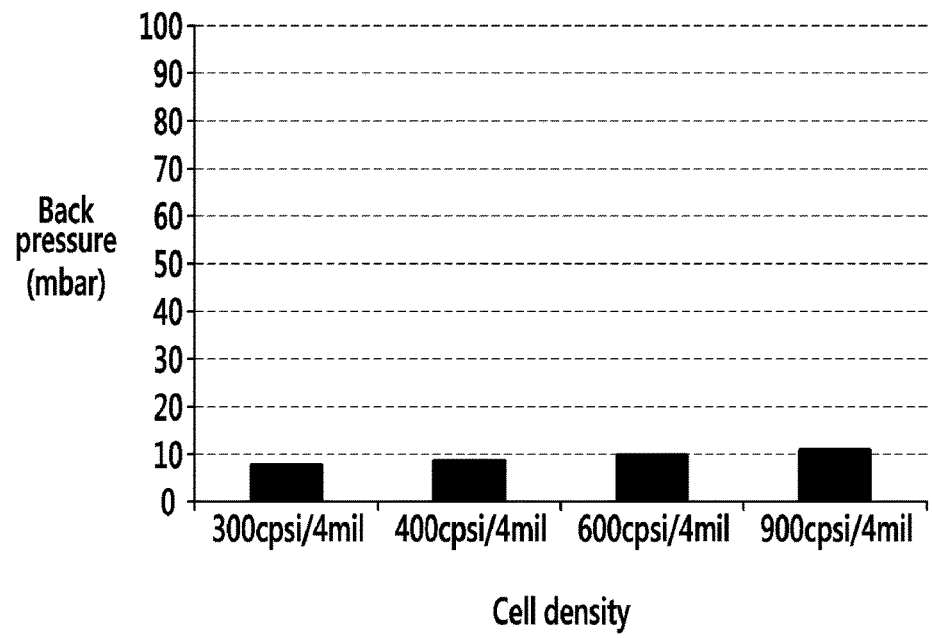
FIG. 8 is a graph illustrating the back pressure plotted as a function of the cell density in the flow-through carrier.

Referring now to FIG. 8, a graph illustrating the back pressure plotted as a function of the cell density in the flow-through carrier is provided. In, FIG. 9, a graph illustrating the back pressure plotted as a function of the cell density in the wall-flow particulate filter. The X-axis in FIG. 8 describes both the cell density and the wall thickness. For example, 300 cpsi/4 mil means a cell density of 300 cpsi and a wall thickness of 4 mil. FIG. 8 shows measurement data obtained only by varying the number of cells in a flow-through carrier with the same cross-sectional area as the wall-flow particulate filter.

Still referring to FIG. 8, it can be seen that there is only a slight increase in back pressure even if the number of cells in the flow-through carrier increases. As mentioned previously, the support 40 may play the same role as the flow-through carrier. Accordingly, it is expected that even an increase in the number of supports 40 will result in only a slight increase in back pressure.

Figure 9:
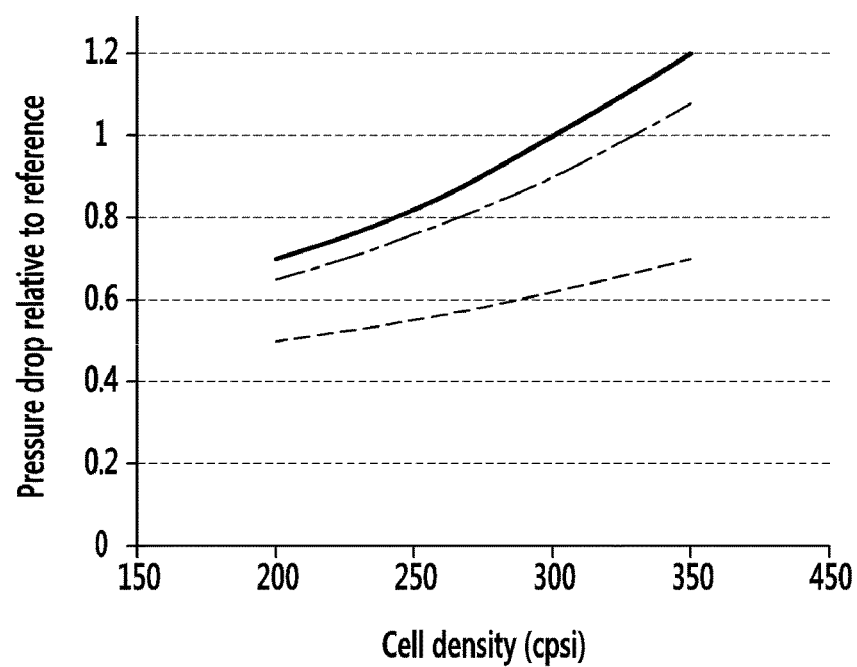
FIG. 9 is a graph illustrating the back pressure plotted as a function of the cell density in the wall-flow particulate filter.

Referring now to FIG. 9, the dotted line represents a wall thickness of 8 mil, the one-dot chain line represents a wall thickness of 12 mil, and the solid line represents a wall thickness of 13 mil. FIG. 9 shows the ratio of the back pressure plotted as a function of cell density relative to a reference back pressure because the back pressure varies greatly with cell density. In FIG. 9 measurement data obtained only by varying the number of cells in a wall-flow particulate filter with the same cross-sectional area as the flow-through carrier is shown. Still referring to FIG. 9, in the wall-flow particulate filter, the back pressure increases as the number of cells increases. It can be seen that the increase in back pressure is large especially if the wall thickness is large. Since the particulate filter functions as a filter, the larger the wall thickness, the better the filter performance. However, if the wall thickness is large, this limits the number of cells and causes a large increase in back pressure.

Referring now, overall to FIG. 4 through FIG. 9, the nitrogen oxide reduction rises as the amount of catalyst coating on the particulate filter 1 increases. However, the increase in the amount of catalyst coating on the particulate filter 1 causes a rise in back pressure. Moreover, the number of cells in the wall-flow particulate filter 1 is limited because of the back pressure and the thickness of the wall 30 (i.e., in order to achieve sufficient filter performance).

On the other hand, in the case of the flow-through carrier, the increase in back pressure is small even with an increase in the amount of catalyst coating, and there is no need to achieve sufficient filter performance. Thus, the number of cells can be increased a lot by making the walls sufficiently thin. As mentioned previously, the support 40 according to this aspect of the present disclosure is not required to function as a filter but only serves as a carrier for holding the catalyst 50. Accordingly, the support 40 according to this aspect of the present disclosure performs the same function as the flow-through carrier. Consequently, the increase in back pressure is minimized even with an increase in the number of supports 40. Moreover, a sufficient number of supports 40 can be mounted on the particulate filter 1 since the support 40 can be made thin. In addition, the support 40 allows for an increase in the amount of catalyst 50 supported on it and a longer contact time (e.g., larger contact area) between the catalyst 50 and exhaust gases, thereby improving the nitrogen oxide reduction.

Figure 10:
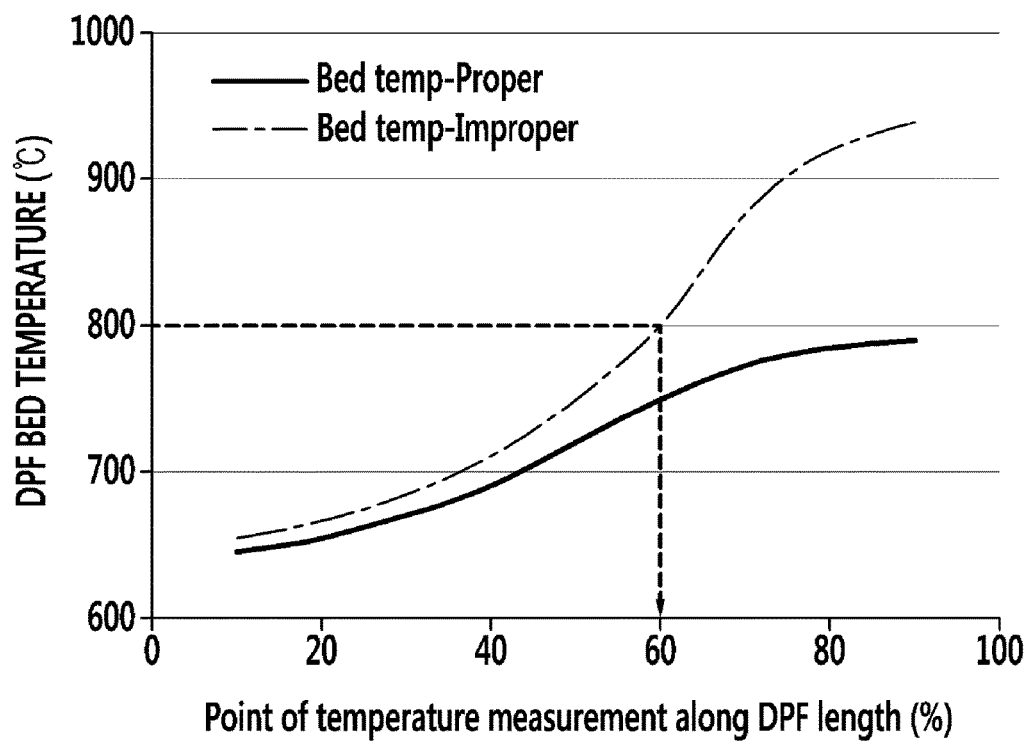
FIG. 10 is a graph illustrating the temperature plotted as a function of the position of the particulate filter during regeneration of the particulate filter and a schematic view of the support for which a predetermined length is set.
Figure 10:
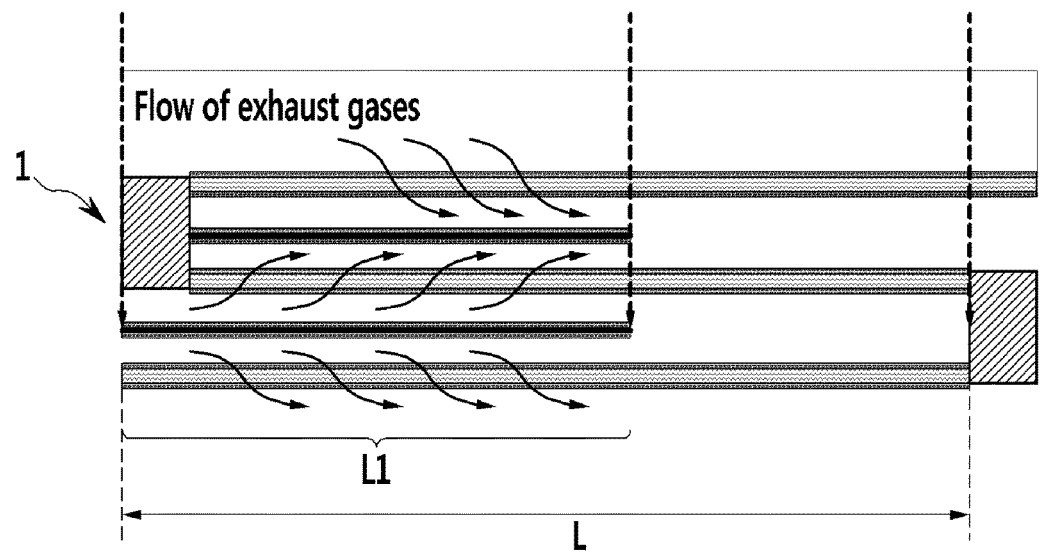

Referring now to FIG. 10, a graph of the temperature plotted as a function of the position of the particulate filter during regeneration of the particulate filter and a schematic view of the support for which a predetermined length is set are provided. In FIG. 10, the solid line represents the temperature vs. the position of the particulate filter when the particulate filter regenerates properly, and the one-dot chain line represents the temperature vs. the position of the particulate filter when the particulate filter regenerates improperly (for example, when a large amount of oxygen is supplied to the particulate filter because the engine breaks down during regeneration).

Still referring to FIG. 10, it can be seen that the temperature of the particulate filter during regeneration increases along the flow of exhaust gases. The temperature of the particulate filter increases abruptly along the flow of exhaust gases, especially when the particulate filter regenerates improperly. The catalyst 50 coated on the support 40 may be damaged at high temperatures. Thus, the support 40 may be placed in a position other than the one where the temperature of the particulate filter 1 may rise higher than the temperature limit (for example, 800° C. in FIG. 10) at which the catalyst 50 can be damaged, or the support 40 may not be coated with the catalyst 50. Accordingly, the support 40 may extend over a length L1 from one end of the particulate filter 1 (the open end of the inlet channel 10). The length L1 may be set based on the temperature distribution of the particulate filter 1, especially during improper regeneration. For example, in the example illustrated in FIG. 10, the length L1 may be about 50% to 70% of the entire length L of the inlet channel 10. Also, the length L1 may be set based on the type of the catalyst 50 coated on the support 40.

While this disclosure has been described in connection with what is presently considered to be practical examples, it is to be understood that the disclosure is not limited to the disclosed examples, but, on the contrary, is intended to cover various modifications and equivalent arrangements included within the spirit and scope of the appended claims.

What is claimed is:

1. A catalyzed particulate filter having a first end and extending to a second end and comprising:
   at least one inlet channel extending in a longitudinal direction, and having one end at the first end into which fluid flows, and the other end at the second end which is blocked;
   at least one outlet channel extending in the longitudinal direction, and having one end at the first end which is blocked and the other end at the second end through which the fluid flows out;
   at least one porous wall that defines the boundary between neighboring inlet and outlet channels and that extends in the longitudinal direction; and
   a support with a catalyst coating thereon,
   wherein the fluid flowing into through the inlet channel passes through the porous wall and flows to the outlet channel, and
   the support is located within at least one of the at least one inlet channel and the at least one outlet channel, and extends over a predetermined length from the first end of the particulate filter, the predetermined length being about 50% to 70% of the entire length of the catalyzed particulate filter.

2. The catalyzed particulate filter of claim 1, wherein the support extends in the longitudinal direction.

3. The catalyzed particulate filter of claim 1, wherein the catalyst is coated on a surface of the support.

4. The catalyzed particulate filter of claim 3, wherein the catalyst is additionally coated on the porous wall.

5. The catalyzed particulate filter of claim 1, wherein the support is made from the same material as the porous wall.

6. The catalyzed particulate filter of claim 1, wherein the support is made from a different material from the porous wall.

7. The catalyzed particulate filter of claim 1, wherein the support is located within at least one among the at least one inlet channel and is located within at least one among the at least one outlet channel.

8. The catalyzed particulate filter of claim 1, wherein the support is located only within at least one among the at least one inlet channel or only within at least one among the at least one outlet channel.

9. A catalyzed particulate filter having a first end and extending to a second end and comprising:
   at least one inlet channel having one end at the first end which is opened to receive fluid there into and the other end at the second end which is blocked to prevent the fluid from flowing out there through;
   at least one outlet channel disposed alternately with the at least one inlet channel and having one end at the first end which is blocked to prevent the fluid from flowing there through and the other end at the second end which is opened to cause the fluid to flow out, the inlet channel and the outlet channel extending parallel to each other;
   a porous wall that is placed between neighboring inlet and outlet channels and that allows the fluid in the inlet channel to flow to the outlet channel; and
   a support with a catalyst thereon that is located within at least one among the at least one inlet channel and the at least one outlet channel, the support extending parallel to the direction in which the inlet channel and the outlet channel extend, the support extending over a predetermined length from the first end of the catalyzed particulate filter, the predetermined length being set based on the temperature distribution of the particulate filter.

10. The catalyzed particulate filter of claim 9, wherein the catalyst is additionally coated on the porous wall.

11. The catalyzed particulate filter of claim 9, wherein the support is made from the same material as the porous wall.

12. The catalyzed particulate filter of claim 9, wherein the support is made from a different material from the porous wall.

13. The catalyzed particulate filter of claim 9, wherein the support is thinner than the porous wall.

14. The catalyzed particulate filter of claim 10, wherein the amount of catalyst coating on the support is greater than the amount of catalyst coating on the porous wall.

* * * * *